Patented Mar. 3, 1942

2,275,008

UNITED STATES PATENT OFFICE 2,275,008

POLYMERIC MATERIALS

Donald Drake Coffman, Wilmington, Del., assignor to E. I. du Pont de Nemours & Company, Wilmington, Del., a corporation of Delaware No Drawing. Application September 25, 1939, Serial No. 296,495

11 Claims. (Cl. 18—54)

This invention relates to polymeric materials and more particularly to treatment of synthetic linear polyamides.

In my application Serial Number 229,972, filed September 14, 1938, Patent No. 2,177,637, there is disclosed the beneficial results obtained by treating synthetic linear polyamides with formaldehyde, as for instance improved recovery from deformation of fibers made from the polymer, crimp retentivity of the crinkled fibers, increased stiffness in the bristles, etc.

This invention has as an object a process for insolubilizing water-soluble polyamides. A further object is to raise the melting point of these polyamides. A still further object is the production of new and useful compositions of matter. Another object is the preparation of filaments, ribbons, films, and the like. Other objects will appear hereinafter.

These objects are accomplished by incorporating in the water-soluble linear polyamides, preferably in the form of films or filaments, etc. an insolubilizing agent such as formaldehyde or similarly acting substances and then heating the polyamide containing said agent to effect water insolubilization.

The synthetic linear polyamides referred to above are of the general type described in Patents 2,071,250, 2,071,253, and 2,130,948. The polyamides with which this invention is concerned are those of this type which are water-soluble. By "water-soluble polyamides" is meant those polyamides which are soluble either in water alone or in aqueous alcohol solution. The term "polyamide" refers not only to the polyamides obtained from polyamide-forming reactants only (including the interpolyamides obtained from mixtures of these reactants) but also to linear polymers in which amide groups form an integral part of the main chain of atoms, as for instance, the ester-amide interpolymers.

Water-soluble polyamides particularly well adapted to the practice of this invention are found in the class of polyamides which contain hetero atoms of the oxygen family and which are described in Patent No 2,158,064 and in the application of W. H. Carothers Serial Number 225,242 filed August 16, 1938, Patent No. 2,191,556. These polyamides, some of which are very soluble in water, represent a large class. For example, it is possible to make polyamides in which the diamine represented contains the hetero atom, polyamides in which the di-basic acid represented contains the hetero atom, and polyamides in which both the diamine and dibasic acid represented contain hetero atoms. It is also possible to make polyamides in which only part of the diamines or dibasic acid reactant is of the hetero atom type. A mixture of diamines and/or dibasic acids can also be used in preparing interpolyamides. Other bifunctional reactants, such as amino acids, hydroxy acids, and glycols, can also be used in conjunction with the diamines and dibasic acids.

Another useful type of water-soluble polyamide is prepared by the interpolymerization of hexamethylene diammonium adipate with epsilon-aminocaproic acid or their equivalents, preferably in a ratio of 40:60 parts by weight. This interpolymer is soluble in aqueous alcohol and from this solution can be readily cast into films which are further given the insolubilizing treatment of this invention.

In carrying out the invention with polyamides soluble in water alone, the usual practice is to cast the film from solution, drying the film under ordinary conditions of temperature and humidity, coating or impregnating the film with a saturated aqueous solution of the insolubilizing agent, and then baking the film. One or more coats may be applied with a brush or spray after which the film is baked from 8 to 16 hours at about 100°—120° C. In the case of solutions of the polyamide in aqueous alcohol or miscible solutions of water with other aliphatic hydroxylated compounds, the insolubilizing agent is added as such, or in solution in the same solvent, to the polyamide solution just prior to casting the film, or the agent is added to the film after casting but before it has dried. The film may also be dipped momentarily in the solution of the insolubilizing agent, or in the agent itself, provided the agent is capable of swelling and penetrating the film. Generally the insolubilizing agent is applied in excess. The insolubilizing agent softens and swells the film, and may even partially dissolve it. This permits adequate penetration and allows insolubilization to be effected in the subsequent heating step.

The polyamides referred to hereinafter are prepared by heating a salt of a dibasic acid with a diamine, or by other methods described in Patent No. 2,130,948, or by polymerizing an amino acid or an amide-forming derivative thereof, as described in Patent No. 2,071,253. Interpolyamides are prepared by using more than one polyamide-forming composition, e. g. a mixture of diamine-dibasic acid salts. The polyamides prepared from the polymer-forming compositions listed below and referred to by the letters A to Q, were used in the following examples illustrating the practice of this invention.

COMPOSITION

- A 85% triglycoldiamine-adipic acid—
  15% hexamethylenediamine-adipic acid
- B 70% triglycoldiamine-adipic acid—
  30% hexamethylenediamine-diglycollic acid
- C 80% triglycoldiamine-adipic acid—
  20% hexamethylenediamine-sebacic acid
- D 90% triglycoldiamine-adipic acid—
  10% decamethylenediamine-sebacic acid
- E 95% triglycoldiamine-adipic acid—
  5% hexamethylenediamine-adipic acid
- F 90% triglycoldiamine-adipic acid—
  10% hexamethylenediamine-adipic acid
- G 93% triglycoldiamine-adipic acid—
  7% decamethylenediamine-sebacic acid
- H 90% triglycoldiamine-adipic acid—
  10% hexamethylenediamine-sebacic acid
- I 80% triglycoldiamine-adipic acid—
  20% hexamethylenediamine-diglycollic acid
- J 95% triglycoldiamine-adipic acid—
  5% epsilon-aminocaproic acid
- K 90% triglycoldiamine-adipic acid—
  10% epsilon-aminocaproic acid
- L 85% triglycoldiamine-adipic acid—
  15% epsilon-aminocaproic acid
- M 80% triglycoldiamine-adipic acid—
  20% epsilon-aminocaproic acid
- N Copolymer of 85% triglycoldiamine-adipic acid—
  15% epsilon-aminocaproic acid with 50% polyvinyl alcohol
- O Copolymer of 90% triglycoldiamine-adipic acid—
  10% hexamethylenediamine-adicic acid with 50% polyvinyl alcohol
- P Copolymer of 90% triglycoldiamine-adipic acid—
  10% hexamethylenediamine-adipic acid with 50% polymethacrylamide
- Q 60% hexamethylenediamine-adipic acid—
  40% caprolactam The percentage compositions refer to parts by weight of the polymer-forming compositions in the reaction mixture before polymerization was effected. The polyamides (including interpolymers) and their copolymers were made up into 10% aqueous solutions by weight.

EXAMPLE I

Polymers A, B, C, and D in 10% aqueous solutions were cast into films on glass plates. One set of such films was treated with 37% formalin and another set was treated with a saturated aqueous solution of dimethylolurea diethyl ether. These insolubilizing agents were applied with a paintbrush until an excess was added and the films become soggy. After baking overnight at 100° C. the films were immersed in water at 25° C. to determine how readily they dissolve. The following table shows that marked insolubilization occurred.

A comparison of the melting points of the untreated polymers with those of corresponding polymers insolubilized with the diethyl ether of dimethylolurea shows that marked elevation in melting point is effected.

TABLE II

| Composition | Untreated | Treated |
| --- | --- | --- |
|  | °C. |  |
| A | 117–119 | 318° C. (decomp.). |
| B | 103–107 | 315° C. (decomp.). |
| C | 116–118 | 340° C. (decomp.). |
| D | 106–116 | 300° C. (decomp.). |

EXAMPLE II

Films from polymers A, B, C, E, F, G, H, and I were prepared by casting 10% aqueous solutions of the polyamide on glass plates and allowing the films to dry under ordinary conditions. The films were then soaked with a saturated aqueous solution of diethyl ether of dimethylolurea and baked for 16 hours at 150–160° C. in an inert atmosphere such as nitrogen. After baking, each of the films can be immersed in boiling water for 5 minutes without appreciable solution occurring. The untreated films dissolve almost immediately when immersed in boiling water.

EXAMPLE III

Polymers J, K, L and M were cast into films from aqueous 10% solution. The films were coated with an excess of a hot saturated aqueous solution of diethyl ether of dimethylolurea and were then baked for 16 hours at 105° C. The melting point of every film is markedly increased by the treatment and the solubility in water is notably diminished, although the polyamides absorb an appreciable quantity of water without dissolving. The ability of the films to absorb moisture is calculated by immersing the film in water for 24 hours at 25° C., weighing the saturated film, and then drying to constant weight. The films do not melt when heated to 280° C. on a melting block.

TABLE III

| Composition | Time required for solution of untreated film in water at 25° C. | Percent solubility of water-in-polymer. Treated film soaked in water at 25° C. | M. P. of untreated film | M. P. of treated film |
| --- | --- | --- | --- | --- |
|  | Minutes |  | °C. | °C. |
| J | 3 | 62 | 178–185 | >280 |
| K | 2 | 74 | 175–180 | >280 |
| L | 3 | 44 | 162–170 | >280 |
| M | 4 | 61 | 145–151 | >280 |

EXAMPLE IV

Aqueous 10% solutions of the following polyamides and polyamide compositions were cast into films: A, F, N, O, and P. The films were treated with an excess of a saturated aqueous solution

TABLE I
*Altered solubility characteristics*

| Insolubilizing agent | A | B | C | D |
| --- | --- | --- | --- | --- |
| Formaldehyde | Film crumbled but did not dissolve in 54 min. | Film still insol. after 24 hrs. | Film crumbled but did not dissolve in 40 min. | Film dissolved in 72 min. |
| Diethyl ether of dimethylolurea. | Not in solution after 48 hrs. | Insol. after 48 hrs. | Insol. after 48 hrs. | Insol. after 48 hrs. |
| Untreated control | Dissolved in 5 min. | Dissolved in 10 min. | Dissolved in 36 min. | Dissolved in 16 min. | of diethyl ether of dimethylolurea and were then baked for 16 hours at 105° C. After this treatment, the films were tough and transparent excepting the film from composition P which was opaque and brittle. All the films showed no sign of solution when immersed in water at 25° C. for 48 hours, or when immersed in water at 90° C. for one hour.

EXAMPLE V

A 20% solution of interpolyamide Q in 55% aqueous alcohol was mixed with a saturated solution of an equal volume of dimethylolurea diethyl ether in 50% aqueous alcohol. Films were cast from this homogeneous solution and baked for 8 hours at 120° C. An untreated control film, cast from 20% solution of interpolyamide Q in 55% aqueous alcohol containing no dimethylolurea diethyl ether and a treated film were immersed in 50% aqueous alcohol at a temperature of 65° C. Under these conditions, the control film dissolved completely in 40 minutes, whereas the treated film did not dissolve at the end of 4 hours, although it was swollen considerably by the treatment. The melting point of the control film was 170–175° C., whereas the melting point of the treated film was raised to 200–205° C.

The present process may be advantageously carried out with mixtures of the polyamides and other types of polymers compatible therewith and with the aqueous solvent. These modified compositions, in addition to the polyamide, may comprise for instance products such as polyvinyl alcohol, polyvinyl alcohol-boric acid complex, partially acetalized polyvinyl alcohol, partially hydrolyzed polyvinyl acetate, polymethacrylamide, and water-soluble interpolymers of styrene with other vinyl compounds.

The insolubilizing agents used in the practice of this invention are compounds having at least one methylene group attached only to elements of groups V and VI of the periodic table and having atomic weights from 14 to 33, i. e. nitrogen, oxygen, sulfur, and phosphorous. The elements to which the methylene group is attached may be the same or different. The active methylene group attached to the elements indicated above is the critical feature of the chemical structure of the methylene compound, and it is that feature alone, regardless of what the rest of the molecule is, that is important in effecting insolubilization. These agents comprise, for instance, the methylolamides, methylolthiamides, methylene thio ethers, the common formaldehyde donors and related compounds. Specific examples are formaldehyde, paraformaldehyde, hexamethylenetetramine,

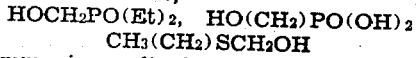

the ammonium salt of methylene sulfamic acid, dimethylolurea, and dimethylol adipamide.

Reaction of the methylene compounds with the polyamides occurs at a comparatively low temperature, but a temperature of at least 75 to 80° C. is desirable to make the reaction feasible from the time standpoint. By protecting the polyamide with an atmosphere of nitrogen, temperatures just short of their decomposition temperatures may be used. It has been found that 100–120° C. is a convenient temperature range for effecting insolubilization without blanketing the polyamide compositions with an inert atmosphere. Higher temperatures can be used, particularly under non-oxidizing conditions. The films are completely insolubilized at the end of 8 hours' baking, and considerable alteration in solubility can be obtained in only one or two hours. Longer periods of baking, such as 8 to 15 hours, do not have any deleterious effects on the final product.

The polyamides are preferably treated while in pellicular form with the insolubilizing methylene compounds. The treatment may, however, be applied to other polyamide articles such as ribbons, bristles, fibers, fabrics and massive molded forms.

It is also possible to use the process of my invention directly in the preparation of shaped articles, such as filaments and pellicles. Thus, the molten polymer may be extruded in predetermined shape, as from a nozzle, into a bath containing the insolubilizing agent. The articles thus formed will absorb some of the insolubilizing agent and by heating will be rendered substantially insoluble in water. Solutions of the water-soluble polyamides can also be extruded into a bath containing the insolubilizing agent dissolved in a non-solvent for the polymer, or even into aqueous solutions of the insolubilizing agent, particularly when hot, since the insolubilizing agent acts as a coagulation agent for the polymer. The coagulated article can then be heated to complete the insolubilization. These processes can also be used in applying a coating of the polyamide on fabrics and other articles.

Examples of other polyamides suited to the practice of this invention include such water-soluble polyamides as polytriglycol sebacamide, polytriglycol-suberamide, polytriglycol glutaramide, and polytriglycol beta-methyl adipamide. Interpolyamides (i. e., polyamides derived from a mixture of polyamide-forming reactants capable of yielding more than one polyamide) derived from polyamide-forming compositions which yield the foregoing polyamides with hexamethylene diammonium adipate, decamethylene diammonium adipate, decamethylene diammonium sebacate, hexamethylene diammonium sebacate and with polymerizable amino acids, such as 6-aminocaproic acid and 11-aminoundecanoic acid, may also be used.

This invention is particularly valuable in connection with the coating and impregnation arts. The present process makes possible the deposition of films or protective coatings of the polyamide, which may be subsequently insolubilized, on wire and on fabrics such as cloth, paper, leather etc. A noteworthy feature of this invention is the fact that the melting point of the polyamide or polyamide composition used is markedly raised. The present process is also useful in the application of insoluble films in photography and lithography.

As many apparently widely different embodiments of this invention may be made without departing from the spirit and scope thereof, it is to be understood that I do not limit myself to the specific embodiments thereof except as defined in the appended claims.

I claim:

1. A process which comprises incorporating into a water-soluble synthetic linear polyamide an insolubilizing agent comprising a compound having a methylene group attached only to elements selected from groups V and VI of the periodic table and having an atomic weight of from 14 to 33, and then heating the polyamide containing said agent.

2. A process which comprises baking a composition comprising a water-soluble synthetic linear polyamide and an insolubilizing agent comprising a compound having a methylene group attached only to elements selected from groups V and VI of the periodic table and having an atomic weight of from 14 to 33.

3. A process which comprises treating in pellicular form a water-soluble synthetic linear polyamide with an insolubilizing agent comprising a compound having a methylene group attached only to elements selected from groups V and VI of the periodic table and having an atomic weight of from 14 to 33, and then baking the product thus obtained until it is substantially insoluble in water.

4. A process which comprises adding to a solution of water-soluble synthetic linear polyamide an insolubilizing agent comprising a compound having a methylene group attached only to elements selected from groups V and VI of the periodic table and having an atomic weight of from 14 to 33, forming from said solution an article comprising said polyamide and agent, and baking said article until it is substantially insoluble in water.

5. In the manufacture of polyamide articles, the step which comprises extruding a water-soluble synthetic linear polyamide in predetermined shape into a bath containing an insolubilizing agent for said polyamide, said insolubilizing agent comprising a compound having a methylene group attached only to elements selected from groups V and VI of the periodic table and having an atomic weight of from 14 to 33.

6. A process for making articles of the class consisting of filaments and pellicles which comprises extruding a water-soluble synthetic linear polyamide from a suitable nozzle into a bath containing an insolubilizing agent comprising a compound having a methylene group attached only to elements selected from groups V and VI of the periodic table and having an atomic weight of from 14 to 33, and then heating the resultant articles until they are substantially insoluble in water.

7. A coating composition comprising a water-soluble synthetic linear polyamide and an insolubilizing agent comprising a compound having a methylene group attached only to elements selected from groups V and VI of the periodic table and having an atomic weight of from 14 to 33.

8. The process set forth in claim 1 in which said insolubilizing agent is an ether of dimethylol urea.

9. The process set forth in claim 1 in which said insolubilizing agent is dimethylol urea diethyl ether.

10. The process set forth in claim 7 in which said insolubilizing agent is an ether of dimethylol urea.

11. The process set forth in claim 7 in which said insolubilizing agent is dimethylolurea diethyl ether.

DONALD DRAKE COFFMAN.